Patented Feb. 19, 1952

2,586,124

UNITED STATES PATENT OFFICE 2,586,124

PROCESS FOR THE PREPARATION OF CHLORINATED RUBBER

Gerrit Jan van Amerongen, The Hague, Netherlands, assignor to Rubber-Stichting, Delft, Netherlands No Drawing. Application March 21, 1950, Serial No. 151,040. In the Netherlands June 12, 1947

7 Claims. (Cl. 260—772)

This invention relates to a process for the production of chlorinated rubber by the chlorination of an acidified stabilized aqueous dispersion of rubber.

The principal object of the present invention is to provide a method for the production of chlorinated rubber containing only a negligible amount of oxygen, from aqueous dispersions of rubber. Another object of the invention is to provide a process for the preparation of chlorinated rubber which does not require the use of solvents during the chlorination.

A further object of this invention is to provide a procedure for the preparation of chlorinated rubber from which aqueous dispersions of chlorinated rubber may be obtained readily. Still another object of this invention is to provide a procedure for the preparation of chlorinated rubber of very high molecular weight and low oxygen content. Other objects of this invention include the provision of a rapid and economical process for the manufacture of chlorinated rubber and aqueous dispersions thereof.

It is well known that rubber, in the form of sheet, crêpe or reclaimed rubber milled to thin sheets, can be converted into chlorinated rubber by subjecting it to the action of chlorine. The reaction is, however, difficultly controlled, and non-homogeneous products are usually obtained.

Chlorinated rubber has been prepared also by dissolving rubber in a solvent (e. g. benzene, carbon tetrachloride, chloroform) and passing chlorine through the solution. The use of a solvent has the disadvantage that its complete recovery makes the process expensive; moreover the solutions are not very concentrated so that the yield per unit of volume of the reaction vessel is small. The rubber must be broken down to a considerable extent to enable the preparation of a sufficiently concentrated solution having a not too high viscosity. From this broken down rubber a chlorinated rubber can only be prepared with a relatively low molecular weight.

From rubber which has not been broken down by mastication, as it is present in the latex such as Hevea latex, a chlorinated rubber could not be prepared because coagulation takes place upon the introduction of chlorine into the latex, due to the formation of hydrochloric acid.

Various methods have been proposed by which coagulation of the latex could be prevented from interfering with the chlorination process, but the chlorinated rubber according to these methods is not obtained in the form of a concentrated, stable aqueous dispersion, and it contains always a considerable amount of oxygen. When the oxygen is not deliberately introduced into the rubber molecule prior to or during the halogenation process, its introduction cannot, as a rule, be prevented because of the well-known reaction between chlorine and water, according to the equation:

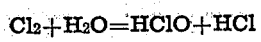

$$Cl_2 + H_2O = HClO + HCl$$

From an investigation of Bloomfield and Farmer (J. Soc. Chem. Ind. 53, 43T (1934) it is known that the hyprochlorous acid formed in this manner reacts readily with the rubber, forming a chlorohydrine rubber. This chlorohydrine rubber has compared with a chlorinated rubber containing no oxygen, the undesirable properties to be hydrophilic, unstable and easily oxidizable.

Generally speaking, the products obtained from latex by the known methods always contain oxygen and therefor show the disadvantages referred to above.

In the operation of the process of the present invention, an aqueous dispersion of rubber is mixed with a material adapted to stabilize the dispersion against coagulation in the presence of acid, and the mixture is acidified until the acidity of the aqueous phase is at least 3 normal, or preferably higher within the range of from about 3 to 10 normal. Chlorine is thereupon introduced into the acid latex whereby a dispersion of chlorinated rubber is obtained which gives, microscopically, the impression of unaltered latex. On chemical examination it appears, however, that a dispersion of chlorinated rubber has been formed. This dispersion can be purified by all kinds of purification methods known for latex.

My invention can be described in greater detail by reference to the following specific examples, which describe operating embodiments of my chlorinating process. The first of these examples illustrates the preparation of chlorinated rubber from a stabilized natural rubber latex, showing particularly the importance of the use of a strongly acid latex for obtaining products with a low oxygen content.

EXAMPLE 1

Commercially available ammonia-preserved Hevea latex having a D. R. C., of 40% was diluted to a D. R. C. of 16%. A 50 ml. portion of the diluted latex was stabilized with 0.5 gr. of cetyl pyridinium bromide dissolved in a small amount of water. Concentrated hydrochloric acid was added until the desired acidity was reached, whereupon chlorine was introduced into the mixture for 5 hours at room temperature. The chlorinated rubber was separated from the dispersion and analyzed:

*Acidity of latex*

|    | C    | H   | Cl   | Ash | O   |
|----|------|-----|------|-----|-----|
| 1N | 33.9 | 3.8 | 59.7 | 0.4 | 2.2 |
| 3N | 38.1 | 4.3 | 56.7 | 0.3 | 0.6 |
| 8N | 34.9 | 3.8 | 61.0 | 0.3 | 0.0 |

EXAMPLE 2

This example illustrates the preparation of chlorinated rubber having a relatively high chlorine content by effecting the chlorination at a higher temperature. To 100 g. Hevea latex with a D. R. C. of 10% are added 12 g. of a 5% solution of cetyl pyridinium bromide, and the latex is acidified with concentrated hydrochloric acid to a normality 8, corresponding with approximately 60% of saturation at 20° C. Thereupon chlorine is introduced at room temperature for 2 hours. From a part of the chlorinated rubber dispersion the chlorinated rubber is removed by centrifuging; analysis of this product showed a chlorine content of 55.7% Another part of the dispersion is further chlorinated at 100° C. for 2 hours. The chlorinated rubber separated from this dispersion had a chlorine content of 61.8%.

EXAMPLE 3

This example illustrates the preparation of chlorinated rubber from concentrated Hevea latex, stabilized with cetyl dimethyl ethyl ammonium bromide. A 150 ml. portion of centrifuged latex, having a D. R. C. of 60%, was stabilized with 2.7 grams of the stabilizer and acidified with 50 ml. of concentrated hydrochloric acid. Chlorine gas was introduced for 37 hours at room temperature. The chlorinated rubber was separated from the dispersion by precipitation with methanol; it showed a chlorine content of 60.4%.

EXAMPLE 4

Other strong, mineral acids may be used instead of the hydrochloric acid to acidify latex in the production of oxygen-free chlorinated rubber, as is shown in the following example. Hevea latex, which had been stabilized by the addition of a dodecyl phenyl polyglycolether commercially available under the trade name "Igepal W" in an amount of 5% calculated on the rubber present, was acidified with sulphuric acid until an acidity of 8 normal was reached. The rubber content of the dispersion amounted to 20%. A chlorination of 3 hours at 20° C. produced a chlorinated rubber having a chlorine content of 47.4%. No oxygen could be found in the product.

EXAMPLE 5

This example illustrates the preparation of chlorinated products of synthetic rubber by chlorinating an acidified aqueous dispersion of the synthetic rubber. 30 g. of an aqueous dispersion of polychloroprene rubber, known under the trade name "Neoprene" latex, having a rubber content of 28%, were stabilized with 10 g. of a 5% aqueous solution of cetyl pyridinium chloride (amounting to 6% of the stabilizer based on the rubber present), and were thereupon saturated with hydrogen chloride gas. Chlorine gas was introduced into the dispersion for 4 hours at room temperature. The chlorinated product obtained had a chlorine content of 57.8%. In an entirely similar way, 50 g. of an aqueous dispersion of the rubbery copolymer of butadiene and acrylonitrile, commercially available under the trade name "Perbunan" latex, containing 15% of the rubber and stabilized with 4.5 g. of a 10% aqueous solution of the reaction product of polyethylene oxide with oleyl alcohol known under the trade name "Emulphor O" was chlorinated to a product containing 49.3% of chlorine.

The same procedure can be applied to the chlorination of latices prepared from all synthetic rubbers which are capable of being chlorinated. These rubbers include rubbers prepared by the polymerization of butadiene, or of 1,3-butadiene derivatives substituted with at least one methyl group, such as isoprene, dimethylbutadiene and methylpentadiene, or by the copolymerization of butadiene with isobutylene, the copolymer of butadiene with styrene and the copolymer of butadiene with acrylonitrile.

If it is desired to prepare chlorinated rubber from synthetic latex, preferably a latex will be used which is obtained directly from the emulsion-polymerization process as an acid resistant latex because the polymerization is carried out in the presence of a suitable emulsifier which renders the latex non-coagulable upon the addition of acid. Consequently synthetic latices need not to be expressly stabilized before the chlorination when they have been produced by polymerization in aqueous emulsion in such a manner that the resulting latex is stable in acid medium. Artificial dispersions of natural or synthetic rubbers can also be used as a starting material, whereby the dispersions are preferably made acid resistant during the preparation by dispersing the rubber in a solution of a suitable emulsifier. Also vulcanized latex, white or yellow fraction latex or skim as obtained by creaming or centrifugal action, or coagulation serum or deproteinized latex can be used as a starting material. Deproteinized latex can e. g. be obtained by boiling with alkali hydroxides followed by dialysis, by decomposition of the proteins with bacteria, by adsorption displacement as is more fully described in the British Patent No. 586,830, and by other methods or by combination of various purification methods.

If an adsorption displacement step is employed it is possible to use as an adsorption displacement agent a material which will at the same time stabilize the latex in acid medium. A pretreatment with the purpose of making the latex acid resistant can then be omitted.

By "acid resistant latex" a latex is meant which does not coagulate by the addition of acid but in which possibly an agglomeration can occur.

It is evident that there are numerous factors which will influence conditions for the most satisfactory operation of the present invention, the actual limits of which cannot be established except by a detailed study of each set of starting materials and the intermediate and finished products involved.

The stabilizing agent required in my process is one which is capable of rendering the latex acid-resistant or incapable of being coagulated at all acid concentrations. The stabilizing agent is, of course, also subjected to the action of the acid and the chlorine and must be capable of withstanding this action without decomposing or losing its stabilizing effect. In some cases it may react with the acid to form another compound but the resulting reaction product must in that case also be a stabilizing agent. For example, if the stabilizing agent is a cationic soap, such as cetylpyridinium bromide, the bromide atom may be replaced to some extent by the chlorine ion provided that the so-formed soap is likewise a stabilizing agent. Thus, the stabilizing agent must be "acid-resistant" in the sense that its stabilizing action is not destroyed by acids. The term "acid-resistant stabilizer" in the following description and in the claims is used with this meaning. The stabilizing agent must, of course, also be sufficiently soluble in water to produce the desired effect.

The suitability of any stabilizing agent which is "acid resistant" in the sense described above, can easily be determined by a simple test. To natural rubber latex having a D. R. C. of not less than about 30% is added enough of the stabilizing agent to provide a concentration of not substantially more than 5% by weight. Hydrochloric acid is thereupon introduced into the latex, at room temperature, until the aqueous phase contains more than about 10% of HCl by weight. If the latex has not coagulated during the test, the stabilizing agent can be used in the process of the present invention.

Many chemicals which are referred to as stabilizing agents and which are capable of stabilizing latex to some extent cannot be used in the present process. Examples of these are ammonia, casein, hemoglobin and other similar materials and the anionic stabilizing agents. While highly dilute latices stabilized with some of these agents can be made slightly acid without coagulation, none is capable of rendering latex incapable of coagulation at all acid concentrations, especially the more concentrated latices which are advantageously employed in the present invention.

A large number of stabilizing agents are known which are capable of rendering latex stable against coagulation at the addition of any given quantity of acid. Those skilled in the art know how to produce such stabilized latices. Many of these agents fall within the class known as cationic soaps or cation-active compounds. My tests indicate that all cation-active soaps which are water-soluble and do not lose their emulsifying properties in strongly acid aqueous solution are operative in my process.

Cationic soaps can be defined as soaps the active principle (containing the hydrophobic fatty acid derivative) of which is positively charged and forms part of the cation, in contradistinction to ordinary soaps which are the sodium salts of fatty acids and in which the fatty acid radical is the anion. The fatty acid derivative produces the colloidal effect in both types of soaps.

Among the cationic soaps may be mentioned salts of quaternary ammonium bases and of tertiary amines, having the general formula:

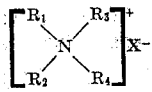

in which R₁ is a member of the group consisting of the alkyl, alkoyl, aralkyl and aryl-alkoyl radicals having at least 12 carbon atoms; $R_2$, $R_3$ and $R_4$ are members of the group consisting of hydrogen and the lower alkyl, aralkyl, aryl and heterocyclic radicals, including derivatives of these groups, such as alkyl sulphonate, alkylamine and alkylol radicals, which tend to increase the solubility in water of the salt, no more than one of the R's representing a hydrogen atom and X is a member of the group consisting of the water-soluble anions.

Examples of suitable cationic emulsifiers are the bromide or chloride of the N-cetyl pyridinium ion, commercially available under the trade-name "Fixanol"; the acetate, hydrochloride or methosulfate of (dialkylamino ethyl)— fatty acid amides, known under the trade-name "Sapamine," the bromide of the cetyl diamethyl ethyl ammonium ion, commercially available under the trade-name "Ethyl Cetab"; and the soluble salts of the cetyl trimethyl ammonium ion, commercially available under the trade-names "Arquad" and "Lissolamine." Generally, every organic nitrogen compound wherein the nitrogen atom has a coordination number of 4, which is water-soluble, and where at least one of the substituents of the nitrogen atom contains a long chain hydrocarbon group and which is moreover acid resistant in the sense given above, is a suitable stabilizer in the process of my invention. These compounds are, however, not all equally effective. I prefer to use, as a cationic emulsifying agent, a compound which, when added in an amount of less than 6% (calculated on the D. R. C.) to the latex having a dry rubber content of at least 40%, is able to stabilize the latex during the chlorinating process of my invention. I have found that the quaternary ammonium salts having a general formula as described above, but in which $R_2$, $R_3$ and $R_4$ are hydrocarbon groups with together not more than 8 carbon atoms, but which may form part of one cyclic hydrocarbon radical (as in the cetyl pyridinium ion) are especially effective in the stabilization of latex in the chlorinating process of my invention. Other cationic soaps can also be used, but in that case the concentration of the soap in the latex should usually be somewhat higher than 5% (calculated on the D. R. C.), or a dilute latex should be used to prevent coagulation during the chlorinating process.

I have also found that the so-called non-ionic emulsifying agents are operative in my process producing even more satisfactory results than the cationic soaps.

A non-ionic emulsifying agent can be defined as a substance having emulsifying properties as a result of the presence, in the molecule of both hydrophilic and hydrophobic groups, the molecule of which does not split into ions when dissolved in water.

The non-ionic emulsifying agents which are particularly suitable in the process of the present invention are the compounds produced according to the Schoeller at al. Patent No. 1,970,578, patented August 21, 1934, by polymerizing ethylene oxide and condensing the polyoxy ethylenic compounds with fatty acid derivatives having an active hydrogen atom.

The products which are commercially available under the trade-names "Emulphor O"; "Vulcastab L. W."; "Mulgofen O"; "Cémulsol T"; "Igepal W" and "Tween" are believed to be produced in accordance with the methods outlined in this patent, whereby as fatty acid derivatives are used: oleyl-alcohol, alkyl-phenol, or a partial ester of hexitol anhydride and long chain fatty acids.

My tests have shown that all non-ionic emulsifying agents which are water soluble and do not lose their emulsifying properties in strongly acid solution are operative in my process.

The concentration of the non-ionic stabilizing agent in the latex can usually be lower than of a cationic soap, to obtain the same degree of stabilization. It ranges from a concentration as low as about 1.5% (calculated on the dry rubber content) in the case of the condensation derivative of a polyglycol ether with oleyl-alcohol known under the trade-name "Emulphor O," to more than 10% in the case of numerous other, less suitable stabilizing agents. By reason of economy and of the undersirable properties which may be caused in the final product by the presence of a relatively large amount of stabilizing agent, I prefer to use those stabilizing agents which are capable of rendering the latex sufficiently stable when added in an amount not exceeding about 6% by weight.

The above list of operative stabilizing agents could be extended considerably. But since the art is aware of methods of producing latices which are incapable of coagulation by the addition of acid, it is not believed necessary to list additional stabilizing agents which are capable of producing these stabilized latices.

The acidification of the stabilized latex takes preferably place with hydrochloric acid, which may be gaseous or in the form of a concentrated aqueous solution. Other strong acids may, however, also be used provided they are added in sufficient quantity to give a hydrogen ion concentration at least corresponding with that in a hydrochloric acid solution of about 3 normal.

Solid chlorinated rubber can be recovered from the dispersion of chlorinated rubbed by precipitation, flocculation and/or sedimentation combined, if desired, with centrifuging or other methods of treatment. The separation of solid chlorinated rubber may be effected by the addition to the dispersion of a precipitant which may be an organic non-solvent, such as alcohol, acetone, dioxane and the like. In contra-distinction to most commercial chlorinated rubber, the solid hydrohalogenated rubber recovered in this process is in a finely divided powder form.

The precipitated and purified solid chlorinated rubber may be dried and used directly in powder form, or the aqueous dispersion of chlorinated rubber recovered in my process can be purified by any of the conventional methods used for purifying latex and then used as a chlorinated rubber latex for industrial applications. The dried powder can also readily be dispersed in water, without heavy machinery being necessary for desintegrating the solid material.

The reaction can take place at normal pressure between 0° and 100° C. It is advantageous to start between 0 and 40° C. and after the reaction has been in progress for a certain time the reaction temperature can be increased e. g. to 70 to 100° C. By the application of pressure it is possible to halogenate at still higher temperatures.

In some cases it may be desirable to accelerate the reaction by irradiation with normal or ultraviolet light.

The halogen content of the product obtained depends on the halogenation time and temperature and in case of chlorination may amount up to 70% of chlorine. The desired chlorine content depends upon the use for which the product is intended. The chlorinated rubber may be used for manufacturing various products such as films, coatings, lacquers and paints for which chlorination must be carried out to such a degree that the product acquires the optimal properties for the desired purpose.

This application is a continuation in part of application Serial No. 775,155, filed September 19, 1947, now abandoned.

What I claim is:

1. In the preparation of aqueous dispersions of non-hydrophilic chlorinated rubber substantially free from oxygen the process which consists substantially in stabilizing a latex of a conjugated diolefin rubber by adding thereto from about 2 to 10 per cent, based on the weight of the rubber present in the latex of a water-soluble cationic soap selected from a class consisting of the water soluble salts of quaternary ammonium bases and of tertiary amines having the general formula:

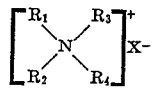

in which $R_1$ is a member of the group consisting of the alkyl, alkoyl, aralkyl and aryl-alkoyl radicals having at least 12 carbon atoms; $R_2$, $R_3$ and $R_4$ are members of the group consisting of hydrogen and the lower alkyl, aralkyl and heterocyclic radicals, no more than one of the R's representing a hydrogen atom, and X is a member of the group consisting of the water-soluble anions, acidifying the stabilized latex by adding sufficient strong mineral acid to produce a normality ranging from about 3 to 10 normal, then passing chlorine into the acidified latex at a temperature within the range of from about 0° to 100° C. whereby a stable aqueous dispersion of a non-hydrophilic stable chlorinated rubber substantially free from oxygen is produced which is substantially indistinguishable under the microscope from the original latex.

2. The process of claim 1 wherein the cationic soap added to the latex is cetylpyridinium chloride.

3. In the preparation of aqueous dispersions of non-hydrophilic chlorinated rubber substantially free from oxygen the process which consists substantially in stabilizing a latex of a conjugated diolefin rubber by adding thereto from about 2 to 10 per cent, based on the weight of the rubber present in the latex, of a water-soluble non-ionic emulsifying agent selected from a class consisting of the reaction products of polyethylene oxide with a member of the group consisting of the aliphatic alcohols and the alkylated phenols having at least 12 carbon atoms, acidifying the stabilized latex by adding sufficient strong mineral acid to produce a normality ranging from about 3 to 10 normal, then passing chlorine into the acidified latex at temperatures within the range of from about 0° to 100° C. whereby a stable aqueous dispersion of a non-hydrophilic stable chlorinated rubber substantially free from oxygen is produced which is substantially indistinguishable under the microscope from the original latex.

4. The process of claim 3 wherein the non-ionic emulsifying agent is the reaction product of octadecenyl alcohol and ethylene oxide.

5. In the preparation of aqueous dispersions of non-hydrophilic chlorinated rubber substantially free from oxygen, the process which consists substantially in adding to an acid-stabilized latex of a conjugated diolefin rubber sufficient strong mineral acid to produce a normality ranging from about 3 to 10 normal, said latex having been acid-stabilized by the prior addition thereto of from about 1½ to 10 per cent, based on the weight of the rubber present in the latex, of a water-soluble acid-resistant emulsifying agent selected from a class consisting of the nonionic and cationic surface active agents capable of stabilizing said latex against coagulation by the added acid under the conditions of the process, then passing chlorine into the so-treated latex until the rubber is substantially chlorinated, whereby a stable aqueous dispersion is obtained, substantially indistinguishable under the microscope from the original latex, of a non-hydrophilic stable chlorinated rubber substantially free from oxygen.

6. The process which consists substantially in adding to a latex of a conjugated diolefin rubber from about 1½ to 10 per cent by weight of a water-soluble acid-resistant emulsifying agent, selected from a class consisting of the nonionic and cationic surface active agents which, in a concentration of about 5 per cent by weight, is capable of preventing the coagulation of a natural rubber latex having a dry rubber content of about 30 per cent when concentrated hydrochloric acid is added thereto at room temperatures until the aqueous phase contains at least about 10 per cent by weight of HCl, adding sufficient strong HCl to make an acid concentration within the range of from about 3 to 10 normal, then passing chlorine into the latex until the rubber is substantially chlorinated, whereby a stable aqueous dispersion is obtained substantially indistinguishable under the microscope from the original latex, of a non-hydrophilic stable chlorinated rubber substantially free from oxygen.

7. The process which consists substantially in adding to a latex of a conjugated diolefin rubber from about 1½ to 10 per cent by weight of a water-soluble acid-resistant emulsifying agent, selected from a class consisting of the nonionic and cationic surface active agents which, in a concentration of about 5 per cent by weight, is capable of preventing the coagulation of a natural rubber latex having a dry rubber content of about 30 per cent when concentrated hydrochloric acid is added thereto at room temperatures until the aqueous phase contains at least about 10 per cent by weight of HCl, adding sufficient strong HCl to make an acid concentration within the range of from about 3 to 10 normal, then passing chlorine into the latex at an initial temperature of from about 0° to 40° C., then raising the temperature to from about 70° to 100° C. and passing in additional chlorine until the latex is substantially chlorinated, whereby a stable aqueous dispersion is obtained, substantially indistinguishable under the microscope from the original latex, of a non-hydrophilic stable chlorinated rubber substantially free from oxygen.

GERRIT JAN van AMERONGEN.

REFERENCES CITED

The following references are of record in the file of this patent:

UNITED STATES PATENTS

| Number | Name | Date |
| --- | --- | --- |
| 2,005,320 | Konrad et al. | June 18, 1935 |
| 2,138,226 | Dales et al. | Nov. 29, 1938 |
| 2,470,952 | Remy | May 24, 1949 |
| 2,503,252 | Ernsberger | Apr. 11, 1950 |

FOREIGN PATENTS

| Number | Country | Date |
| --- | --- | --- |
| 476,743 | Great Britain | Dec. 15, 1937 |